(12) United States Patent
Yoshino

(10) Patent No.: US 7,815,349 B2
(45) Date of Patent: Oct. 19, 2010

(54) MOTOR VEHICLE REAR LIGHT ASSEMBLY

(75) Inventor: Hiroshi Yoshino, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1264 days.

(21) Appl. No.: 11/286,263

(22) Filed: Nov. 23, 2005

(65) Prior Publication Data
US 2007/0115659 A1 May 24, 2007

(51) Int. Cl.
B60Q 1/00 (2006.01)

(52) U.S. Cl. .................. 362/505; 362/545; 362/546; 362/548; 362/549; 362/800

(58) Field of Classification Search .................. 362/231, 362/505, 545–549, 800
See application file for complete search history.

(56) References Cited

U.S. PATENT DOCUMENTS 4,996,634 A * 2/1991 Haneda et al. .............. 362/505
6,520,669 B1 * 2/2003 Chen et al. .................. 362/545
D495,643 S 9/2004 Perfetti et al.
D497,129 S 10/2004 Schlachter
D502,134 S 2/2005 Chan
D514,997 S 2/2006 Hall et al.
D522,427 S 6/2006 Beigel et al.
D528,489 S 9/2006 Schumaker et al.
D528,490 S 9/2006 Schumaker

* cited by examiner

Primary Examiner—Sandra L O'Shea
Assistant Examiner—Meghan K Dunwiddie
(74) Attorney, Agent, or Firm—Plumsea Law Group, LLC

(57) ABSTRACT

A rear light assembly for a motor vehicle is disclosed. The rear light assembly is disposed on a rear portion of the motor vehicle and includes a signaling device and one or more light devices. The signaling device can be either a reflector or include a light. In some cases, the signaling device can be centrally mounted. In some cases, the light devices can be mounted next to the signaling device.

26 Claims, 4 Drawing Sheets

MOTOR VEHICLE REAR LIGHT ASSEMBLY

BACKGROUND OF THE INVENTION

1. Field of the Invention

The present invention relates generally to motor vehicles, and in particular the present invention relates to a rear light assembly for use with motor vehicles.

2. Description of Related Art

U.S. Pat. No. 3,639,748 to Pearson et al. and assigned to the Goodyear Tire & Rubber Company, is directed to a bumper with integral lights. Pearson discloses a light fixture that is integrally formed with the bumper. The bumper is made of a translucent or transparent material that is molded over the light fixtures. A thin layer of bumper material remains over the light fixture, covering the light fixture. This design eliminates the need for a plastic lens cover over the light fixture.

U.S. Pat. No. 4,808,968 to Caine discloses a system to enhance the awareness of drivers on a vehicle's rear brake light. Caine uses rear amber lights placed near the center rear brake light that are continuously on when the vehicle ignition switch is on. The amber lights turn off when the rear brake light comes on. Caine discloses lights mounted on bumper 18. Caine refers to items 16A and 16B as conventional brake or stop lights mounted on rear bumper 18, and items 20A and 20B as conventional turn signals disposed inwardly and closely adjacent to brake or stop lights 16A and 16B.

U.S. Pat. No. 5,497,303 to Decinti et al. discloses a method for decorating bumper covers with lighted letters, logos or designs. The Decinti process is generally an aftermarket process where the bumper cover is removed and the letter or design is cut out of the bumper cover. An illumination device is then placed behind the bumper cover on the bumper reinforcement member (item 12 in the FIGS.). The illumination device is a series of light bulbs 22 attached to a fixture or board 26. By using this arrangement, the letters or logo on the bumper cover can be illuminated. Some embodiments include a lens 60 that can be made to correspond to the letters or logo.

U.S. Pat. No. 6,260,988 to Misawa et al. and assigned to Toyoda Gosei Company, Ltd., is directed to an exterior lamp for a vehicle. The Misawa patent is directed to an illumination system for a motor vehicle that can help the driver locate the vehicle in a parking lot and help show the driver the condition of the ground around the vehicle. To achieve these objectives, Misawa provides light emitting sources at various positions around the vehicle that respond to a keyless entry signal. Misawa also teaches lights that can change colors.

While the related art teaches various kinds of lighting systems, the related art fails to teach a lighting system that is capable of providing improved visibility while reversing a motor vehicle.

SUMMARY OF THE INVENTION

A light assembly is disclosed. The invention can be used in connection with a motor vehicle, and in particular, the rear portion of a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In one aspect, the invention includes a motor vehicle comprising: a chassis configured to receive a driver and having a rear portion; at least one wheel configured to contact a surface; where the rear portion includes a light assembly, the light assembly including first signaling device having a generally red color and a second light device emitting a white light; where the first signaling device is generally centrally located on the rear portion; and where the second light device is disposed adjacent to the first light device.

In another aspect, the rear portion includes a bumper assembly and wherein the light assembly is mounted to the bumper assembly.

In another aspect, the rear portion includes a bumper assembly including a bumper and a bumper cover; and wherein the light assembly is mounted to the bumper cover.

In another aspect, the first signaling device is a reflector.

In another aspect, the first signaling device is a first light device emitting a red colored light.

In another aspect, the first light device includes an incandescent element.

In another aspect, the first light device includes a light emitting diode element.

In another aspect, the invention includes motor vehicle comprising: a chassis configured to receive a driver and having a rear portion; at least one wheel configured to contact a surface; where the rear portion includes a bumper assembly; a light assembly associated with the bumper assembly, the light assembly including first signaling device having a generally red color, a second light device emitting a white light, and a third light device emitting a white light; where the first light device is generally centrally located on the rear portion; and where the second light device is disposed adjacent to a first side of the first light device and where the third light device is disposed adjacent to a second side of the first light device.

In another aspect, the first signaling device has a first width and the second light device has a second width, wherein the first width is greater than the second width.

In another aspect, the third light device has a third width, wherein the first width is greater than the third width.

In another aspect, the second width is substantially similar to the third width.

In another aspect, the first signaling device has a first height and the second light device has a second height, wherein the first height is substantially similar to the second height.

In another aspect, the third light device has a third height, wherein the first height is substantially similar to the third height.

In another aspect, the first signaling device includes a reflector.

In another aspect, the first signaling device includes an incandescent element capable of emitting light.

In another aspect, the first signaling device includes a light emitting diode capable of emitting light.

In another aspect, the invention includes motor vehicle comprising: a chassis configured to receive a driver and having a rear portion; at least one wheel configured to contact a surface; where the rear portion includes a bumper assembly; the bumper assembly including a light assembly hole configured to receive a light assembly, the light assembly including first signaling device having a generally red color, a second light device emitting a white light, and a third light device emitting a white light; where the first light device is generally centrally located on the rear portion; and where the second light device is disposed adjacent to a first side of the first light device and where the third light device is disposed adjacent to a second side of the first light device.

In another aspect, the bumper assembly includes a bumper and a bumper cover and wherein the light assembly hole is disposed on a bumper cover.

In another aspect, the light assembly hole extends through the bumper cover.

In another aspect, the light assembly hole is a slot cut that does not extend through the bumper cover.

In another aspect, the invention includes a motor vehicle comprising: a chassis having at least one wheel configured to contact a surface and configured to receive a driver, the chassis also having a rear portion including a bumper assembly; the bumper assembly including a light assembly hole configured to receive a light assembly, an intermediate member disposed between the bumper assembly and the light assembly; and where the intermediate member is resilient and occupies a space between the bumper assembly and the light assembly.

In another aspect, the intermediate member is made of a material including foam.

In another aspect, the intermediate member is adhesively bonded to the light assembly.

In another aspect, the intermediate member is adhesively bonded to the bumper assembly.

In another aspect, the bumper assembly includes a bumper cover having a bumper mounting flange defining a portion of the light assembly hole; the light assembly having a light assembly flange; wherein the intermediate member is disposed between the bumper mounting flange and the light assembly flange.

In another aspect, a mechanical fastener is used to attach the light assembly to the bumper cover and wherein the mechanical fastener extends through the intermediate member.

In another aspect, the intermediate member is adhesively bonded to the bumper mounting flange.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
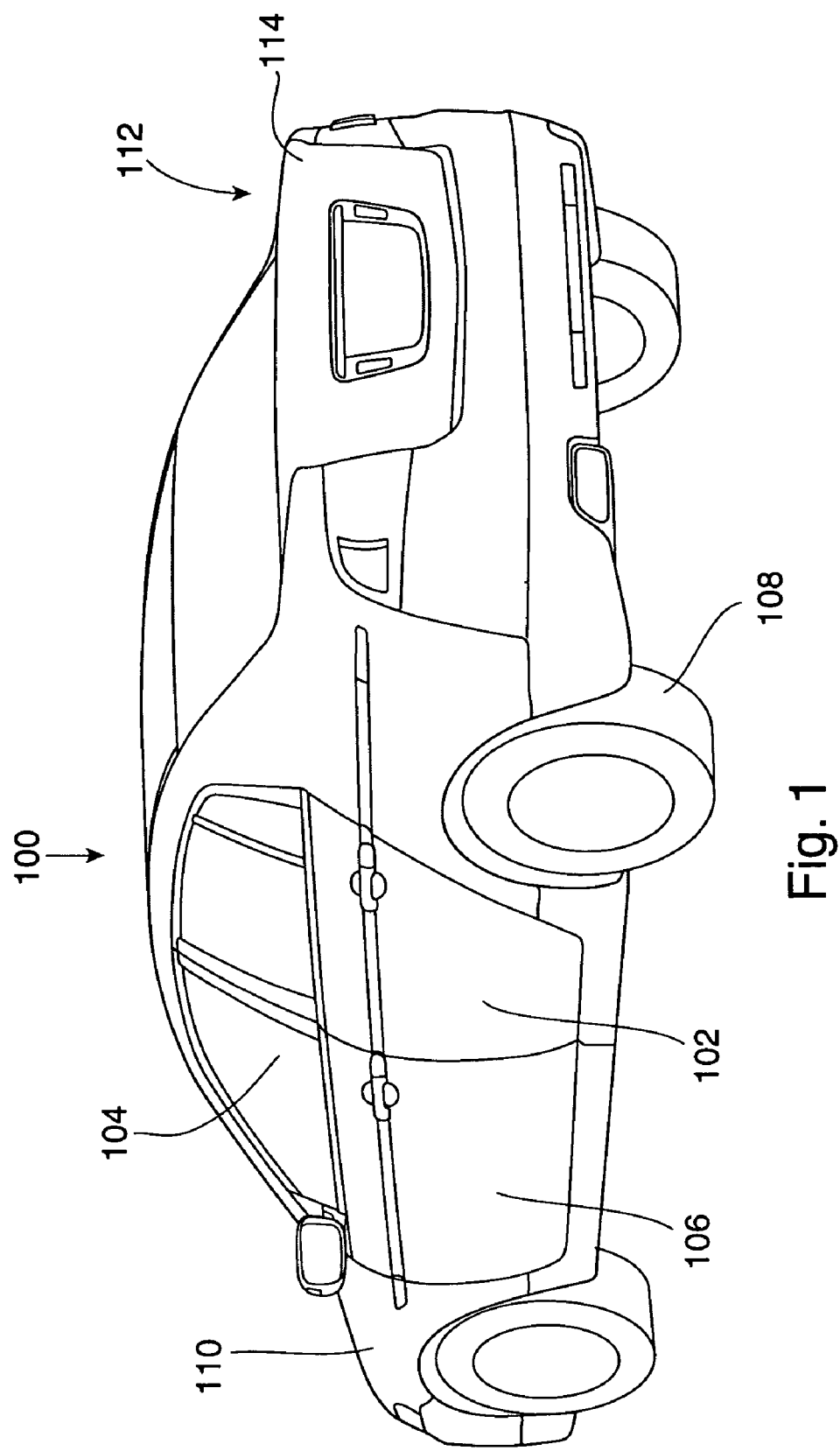
FIG. 1 is an isometric view of a preferred embodiment of a motor vehicle.

FIG. 1 is a schematic diagram of an illustrative embodiment of a motor vehicle 100. Motor vehicle 100 includes a body or chassis 102, at least one wheel 108 adapted to contact a road surface, and a door 106 that provides access to a passenger compartment or interior 104, which is adapted to accommodate at least one human passenger. In some embodiments, motor vehicle 100 does not include door 106. For example, if motor vehicle 100 were a motorcycle, scooter or personal watercraft, motor vehicle 100 would generally not include door 106.

Motor vehicle 100 has a forward portion 110 and a rear portion 112. In some embodiments, rear portion 112 includes a rear door 114. In those embodiments that include rear door 114, rear door 114 can assume different forms. In some cases, rear door 114 can provide access to passenger compartment 104. Some examples of motor vehicles with rear doors that provide access to passenger compartment 104 are vans or minivans. Rear door could also take the form of a hatch if motor vehicle 100 is a hatchback. In other cases, rear door 114 provides access to a storage area disposed behind passenger compartment 104. This storage area can be referred to as a trunk if the storage area is enclosed. In those embodiments, rear door 114 can take the form of a trunk lid. The storage area can be referred to as a bed if the storage area is exposed. In these cases, rear door 114 could take the form of a gate.

Figure 2:
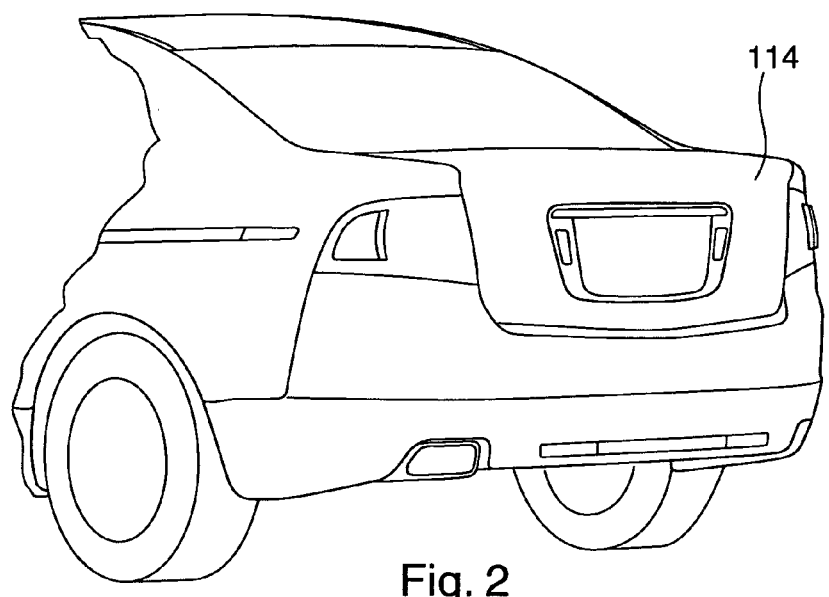
FIG. 2 is an enlarged isometric view a preferred embodiment of a rear portion of a motor vehicle.
Figure 3:
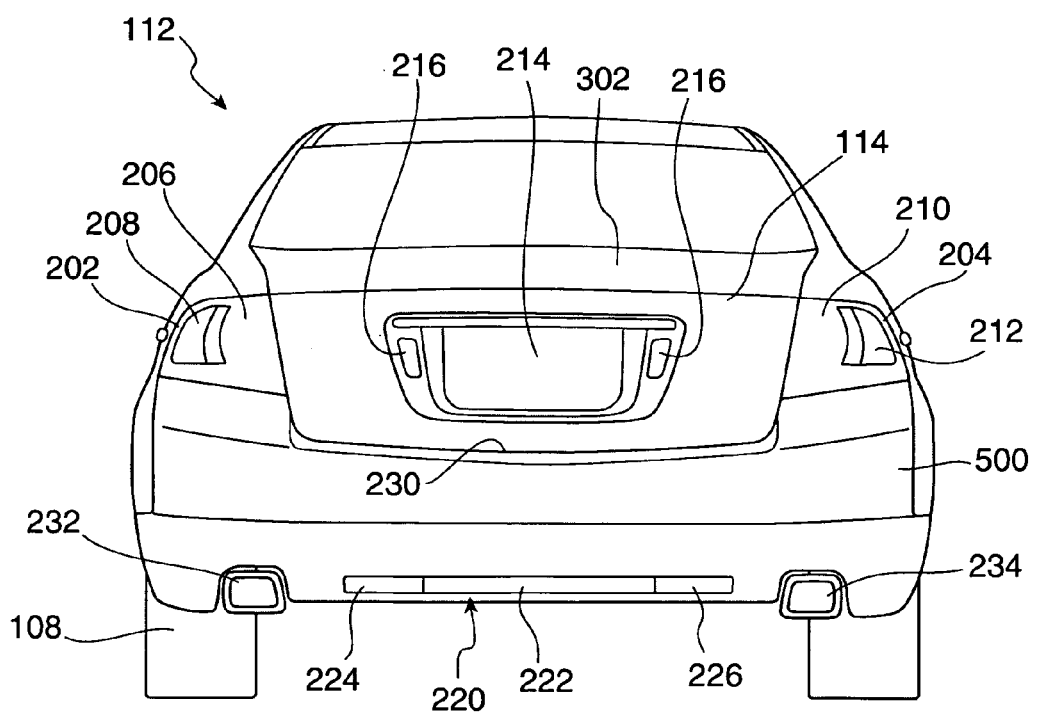
FIG. 3 is an elevation view of a preferred embodiment of a rear portion of a motor vehicle.

Referring to FIGS. 2 and 3, rear portion 112 of motor vehicle 100 preferably includes one or more rear light assemblies. In the embodiment shown in FIGS. 2 and 3, rear portion 112 includes first rear light assembly 202, second rear light assembly 204, and third rear light assembly 220. First rear light assembly 202 can include one or several light elements. In a preferred embodiment, first rear light assembly 202 includes first brake light 206 and first turn signal 208. Preferably these two light elements 206 and 208, are provided in a common housing associated first rear light assembly 202.

Preferably second rear light assembly 204 is similar to first rear light assembly 202 and is disposed on the opposite side of rear portion 112. Like first rear light assembly 202, second rear light assembly 204 includes two elements: second brake light 210 and second turn signal 212. Preferably these two elements are associated with a common housing of second rear light assembly 204. Preferably, first brake light 206 and second brake light 210 are designed to emit a red-colored light when illuminated. Preferably, first turn signal 208 and second turn signal 212 are designed to emit a yellow or amber light when illuminated. Although first rear light assembly 202 and second rear light assembly 204 can be located anywhere within rear portion 112, preferably first rear light assembly 202 and second rear light assembly 204 are disposed within the vertical height of rear door 114.

Preferably rear portion 112 includes a license plate mounting portion 214. Although license plate mounting portion 214 can be located anywhere within rear portion 112, license plate mounting portion 214 is preferably located on rear door 114. License plate mounting portion 214 is configured to receive or engage a license plate (now shown) and is sized and shaped accordingly. In some embodiments, one or more license plate lights 216 are disposed near license plate mounting portion 214 to cast light on a license plate and improve its visibility to other drivers. License plate lights 216 can emit a yellow, pale blue or white light. Preferably, this light is directed towards license plate mounting portion 214.

Preferably, rear portion 112 includes a bumper assembly 500. Preferably bumper assembly 500 is attached to chassis 102 of motor vehicle 100. In the embodiment shown in FIGS. 2 and 3, bumper assembly 500 is disposed generally below rear door 114. While portions of bumper assembly 500 may extend above the lower edge 230 of rear door 114, generally the majority of bumper assembly 500 is disposed below lower edge 230 over rear door 114.

Preferably, rear portion 112 includes third rear light assembly 220. In some embodiments, third rear light assembly 220 includes a single device, however, in preferred embodiments third rear light assembly 220 includes multiple devices. In a preferred embodiment, third rear light assembly includes a signaling device 222, a first light device 224, and a second light device 226. Signaling device 222, first light device 224 and second light device 226 can be associated in some way. In a preferred embodiment, the three devices are adjacent to one another, and in an exemplary embodiment, the three devices are connected or attached. Rear portion 112 can also optionally include one or more tail pipes 232 and 234. In embodiments where rear portion 112 includes two tail pipes, preferably the tail pipes 232 and 234 are part of a dual exhaust system with tail pipes disposed on opposite sides of rear portion 112.

Figure 4:
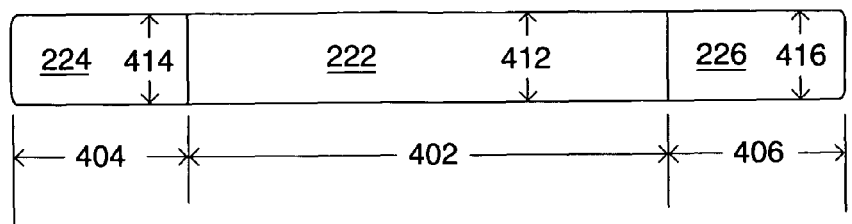
FIG. 4 is an enlarged view of a preferred embodiment of a light assembly.

Referring to FIG. 4, which is an enlarged schematic diagram of third rear light assembly 220, various relationships between the devices that comprise third rear light assembly 220 can be observed. Preferably, signaling device 222 is centrally located with first light device 224 disposed on one side and second light device disposed on the opposite side. As shown in FIG. 4, signaling device 222 has a height 412, and a length 402. First light device 224 has a height 414 and a length of 404, and second light device 226 has a height of 416 and a length of 406. In some embodiments the three devices that comprise third rear light assembly 220 have different sizes. Preferably, however, the devices that comprise third rear light assembly 220 have some similarity in terms of size.

In the preferred embodiment shown in FIG. 4, signaling device 222 preferably has a length 402 that is longer than the length 404 of first light device 224 and the length 406 of second light device 226. Although the three devices can have different heights, in the preferred embodiment shown in FIG. 4, all three lighting devices have similar heights. Thus, signaling device 222 has a height 412 that is generally equal to the height 414 of first light device 224 and the height 416 of second light device 226. These relative sizes yield a light assembly that is generally rectangular in shape, and that is long and narrow. As shown in FIG. 4, third rear light assembly 220 has a long, flat central signaling device 222 with shorter light devices 224 and 226 disposed on either side, with all three lighting devices having roughly the same height.

Although signaling device 222 can emit or reflect a number of different colors, in a preferred embodiment signaling device 222 emits or reflects a red-colored light. In some embodiments, signaling device 222 is a passive reflector that reflects light directed towards it. Preferably in embodiments where a signaling device 222 is a reflector, signaling device 222 includes a red-colored optical element, lens or cover. Alternatively, signaling device 222 can include a light-emitting element, for example, an incandescent lamp or a light, or one or more light-emitting diodes. In those embodiments where signaling device 222 emits light, signaling device 222 preferably includes an optical element such as a lens or cover that has a generally red color. In embodiments where signaling device 222 emits light, it is also possible to provide a light-emitting element that emits a red-colored light.

First light device 224 can also emit or reflect any desired color of light, however, in a preferred embodiment, first light device 224 is designed to emit a white-colored light. Similarly, second light device 226 can also emit or reflect any desired light color. However, in a preferred embodiment, second light device 226 is designed to emit a white-colored light. This lighting configuration results in third rear light assembly 220 having a central red reflecting or emitting device with light devices on either side that are designed to emit a white light.

In embodiments where signaling device 222 includes a light-emitting element, signaling device 222 is preferably associated with the braking system of motor vehicle 100 and is designed to act as a brake light. Preferably first light device 224 and second light device 226 are associated with the transmission of motor vehicle 100 and are designed to act as backup or reverse lights. First light device 224 and second light device 226 are preferably arranged so that when the driver selects a reverse gear, first light device 224 and second light device 226 emit a white light. This helps to improve visibility near rear portion 112 of motor vehicle 100. This can assist the driver in viewing objects and terrain that are behind motor vehicle 100 during low ambient light conditions.

Referring to FIG. 3, the placement of third rear light assembly 220 can be selected to improve the ability of first light device 224 and second light device 226 in providing a flood light illumination effect behind rear portion 112 of motor vehicle 100. To achieve this effect, first light device 224 and second light device 226 are disposed relatively low on rear portion 112. Preferably, third rear light assembly 220 is disposed below first rear light assembly 202 and second rear light assembly 204. In some embodiments, third rear light assembly 220 is disposed below license plate mounting portion 214. It is also possible to locate third rear light assembly 220 below rear door 114.

In a preferred embodiment, third rear light assembly 220 is disposed on bumper assembly 500. In an exemplary embodiment, third rear light assembly 220 is disposed on a lower portion of bumper assembly 500. The relative location of third rear light assembly 220 on rear portion 112 and the short and wide shape of first light device 224 and second light device 226 help to provide a flood light effect behind rear portion 112. Although each of these features, namely, the shape of first light device 224 and second light device 226 and the location of third rear light assembly 220 can be used separately, they are preferably used together as shown in FIG. 3.

Figure 5:
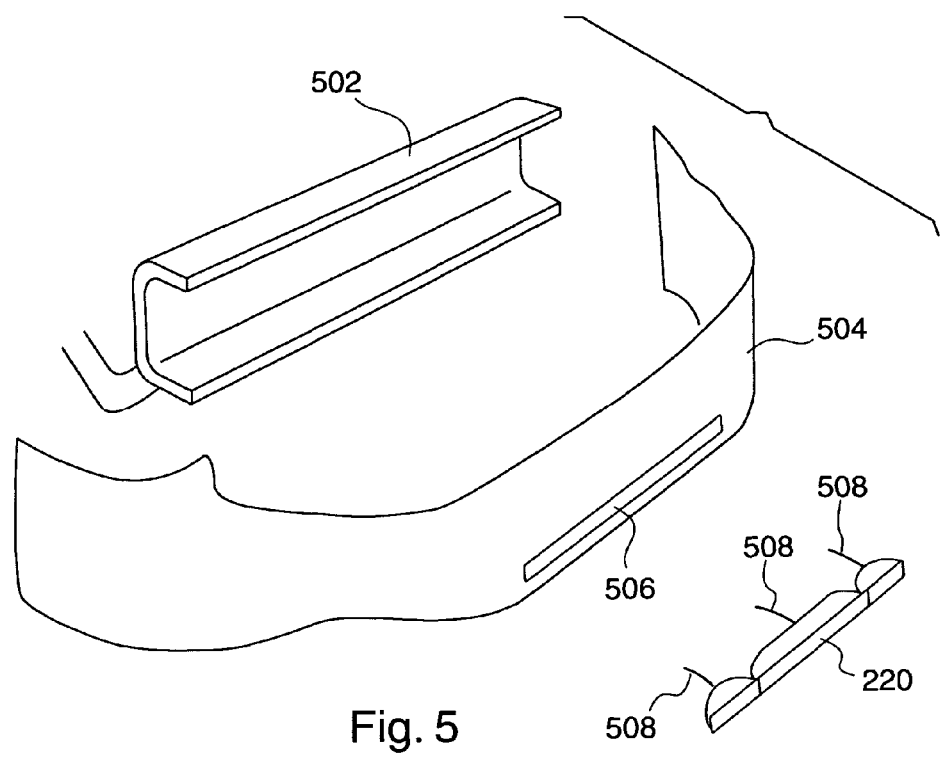
FIG. 5 is an exploded schematic diagram of a preferred embodiment of a bumper assembly.

Third rear light assembly 220 can be associated with bumper assembly 500 in many different ways. Referring to FIG. 5, which is an exploded schematic diagram of bumper assembly 500, a preferred mounting arrangement is shown. Preferably third rear light assembly 220 is mounted to bumper cover 504 which is then mounted to bumper 502. Preferably bumper cover 504 includes a light assembly hole 506 that is shaped and sized to receive third rear light assembly 220. In some embodiments, light assembly hole 506 is aperture that extends through bumper cover 504. In other embodiments, light assembly hole 506 is a slot disposed in bumper cover 504 that does not extend through bumper cover 504. In embodiments where light assembly hole 506 is a slot, light assembly hole 506 preferably includes wire holes to accommodate wires 508 that extend from third rear light assembly 220.

Figure 6:
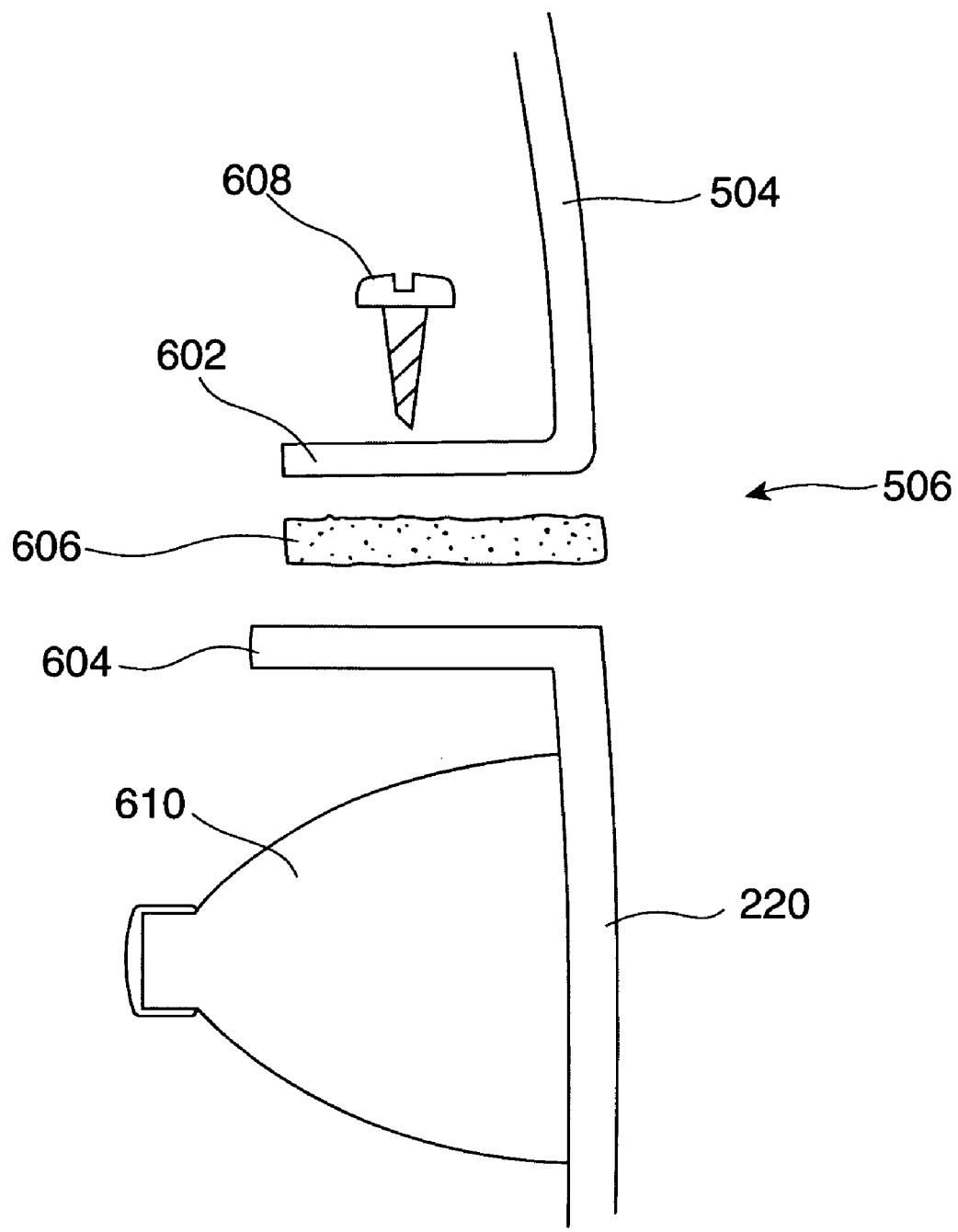
FIG. 6 is a cross-sectional schematic diagram of a preferred embodiment of a bumper cover, a light assembly and an intermediate member.

Some embodiments include provisions to help seal a gap that may exist between light assembly 220 and bumper cover 504. FIG. 6 is an enlarged cross-sectional view of bumper cover 504 and light assembly 220. In the embodiment shown in FIG. 6, bumper cover 504 includes bumper mounting flange 602. Bumper mounting flange 602 extends into light assembly hole 506 and provides a mounting portion that is designed to engage light assembly 220. Light assembly 220 preferably includes light assembly flange 604. In the embodiment shown in FIG. 6, light assembly flange 604 generally corresponds with bumper mounting flange 602 and, in some cases, confronts bumper mounting flange 602.

In some embodiments, an intermediate member 606 is disposed between bumper mounting flange 602 and light assembly flange 604. Intermediate member 606 can be used to provide a seal between bumper cover 504 and light assembly 220. Intermediate member 606 can be used on any desired portion of the interface between bumper cover 504 and light assembly 220. For example, intermediate member 606 can be disposed on the top edge, the bottom edge and/or either side edge of light assembly 220 and the corresponding side of light assembly hole 506 of bumper cover 504. In a preferred embodiment, intermediate member 606 is disposed between the top edge of light assembly 220 and the corresponding side of bumper cover 504. However, it should be kept in mind that intermediate member 606 can be applied to any or all sides of light assembly 220.

Intermediate member 606 can help to prevent dirt, sand, small stones and other debris from entering the gap between bumper mounting flange 602 and light assembly flange 604. In embodiments that do not include intermediate member 606, dirt, sand, small stones and/or debris can enter the gap between bumper mounting flange 602 and light assembly flange 604. When debris is lodged in this gap, the debris can abrade bumper cover 504 and/or light assembly 220 causing damage to one or both members. However, intermediate member 606 can prevent the introduction of debris and foreign matter into this gap and help to prevent subsequent abrading damage caused by this debris.

Intermediate member 606 can be made from any desired material that can provide a seal between bumper mounting flange 602 and light assembly flange 604. In some embodiments, a resilient non-metallic material is used to construct intermediate member 606. In a preferred embodiment, intermediate member 606 is made of a rubbery, foam material. Intermediate member 606 can be attached or associated with either bumper mounting flange 602 or light assembly flange 604 or both.

In a preferred embodiment, intermediate member 606 is associated with one or both adjacent flanges 602 and 604 by adhesively bonding intermediate member 606 to either flange 602 or 604. In an exemplary embodiment, intermediate member 606 is adhesively bonded to bumper mounting flange 602. After intermediate member 606 has been adhesively bonded to bumper mounting flange 602, light assembly 220 is then guided into hole 506 as shown in FIG. 5. In this exemplary embodiment, intermediate member 606 is adhesively bonded to bumper mounting flange 602 but not to light assembly flange 604.

In some embodiments, a mechanical fastener 608 is used to attach light assembly flange 604 to bumper mounting flange 602. In some cases, mechanical fastener 608 extends between both flanges 604 and 602 and also extends through intermediate member 606. Preferably, mechanical fastener 608 is designed so that mechanical fastener 608 does not interfere or otherwise damage optical elements 610 of light assembly 220 during or after installation. Optical elements 610 can include illuminating elements such as bulbs or LCD strips and lenses or other light-deflecting devices.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A motor vehicle comprising:
   a chassis configured to receive a driver and having a rear portion;
   at least one wheel configured to contact a surface;
   wherein the rear portion includes a bumper assembly including a bumper and bumper cover, a light assembly mounted to the bumper cover, the light assembly including a signaling device having a generally red color and a light device emitting a white light to the exterior of the vehicle;
   wherein the signaling device is generally centrally located on the rear portion; and
   wherein the light device is disposed adjacent to the signaling device.

2. The motor vehicle according to claim 1, wherein the rear portion includes a bumper assembly and wherein the light assembly is mounted to the bumper assembly.

3. The motor vehicle according to claim 1, wherein the signaling device is a reflector.

4. The motor vehicle according to claim 1, wherein the signaling device comprises a source of red colored light.

5. The motor vehicle according to claim 4, wherein the source of red colored light includes an incandescent element.

6. The motor vehicle according to claim 4, wherein the source of red colored light includes a light emitting diode element.

7. A motor vehicle comprising:
   a chassis configured to receive a driver and having a rear portion;
   at least one wheel configured to contact a surface;
   wherein the rear portion includes a bumper assembly including a bumper and bumper cover;
   a light assembly mounted on the bumper cover, the light assembly including a signaling device having a generally red color, a first light device emitting a white light to the exterior of the motor vehicle, and a second light device emitting a white light to the exterior of the motor vehicle;
   wherein the signaling device is generally centrally located on the rear portion; and
   wherein the first light device is disposed adjacent to a first side of the signaling device and wherein the second light device is disposed adjacent to a second side of the signaling device.

8. The motor vehicle according to claim 7, wherein the signaling device has a first width and the first light device has a second width, wherein the first width is greater than the second width.

9. The motor vehicle according to claim 8, wherein the second light device has a third width, wherein the first width is greater than the third width.

10. The motor vehicle according to claim 9, wherein the second width is substantially similar to the third width.

11. The motor vehicle according to claim 7, wherein the signaling device has a first height and the first light device has a second height, wherein the first height is substantially similar to the second height.

12. The motor vehicle according to claim 11, wherein the second light device has a third height, wherein the first height is substantially similar to the third height.

13. The motor vehicle according to claim 7, wherein the signaling device includes a reflector.

14. The motor vehicle according to claim 7, wherein the signaling device includes an incandescent element capable of emitting light.

15. The motor vehicle according to claim 7, wherein the first signaling device includes a light emitting diode capable of emitting light.

16. A motor vehicle comprising:
a chassis configured to receive a driver and having a rear portion;
at least one wheel configured to contact a surface;
wherein the rear portion includes a bumper assembly;
the bumper assembly including a light assembly hole configured to receive a light assembly,
the light assembly including a signaling device having a generally red color, a first light device emitting a white light to the exterior of the motor vehicle, and a second light device emitting a white light to the exterior of the motor vehicle;
wherein the signaling device is generally centrally located on the rear portion; and
wherein the first light device is disposed adjacent to a first side of the signaling device and wherein the second light device is disposed adjacent to a second side of the signaling device.

17. A motor vehicle according to claim 16, wherein the bumper assembly includes a bumper and a bumper cover and wherein the light assembly hole is disposed on a bumper cover.

18. A motor vehicle according to claim 16, wherein the light assembly hole extends through the bumper cover.

19. A motor vehicle according to claim 16, wherein the light assembly hole is a slot cut that does not extend through the bumper cover.

20. A motor vehicle comprising:
a chassis having at least one wheel configured to contact a surface and configured to receive a driver, the chassis also having a rear portion including a bumper assembly;
the bumper assembly including a light assembly hole configured to receive a light assembly;
an intermediate member disposed between the bumper assembly and the light assembly; and
wherein the intermediate member is fabricated from a resilient non-metallic material and occupies a space between the bumper assembly and the light assembly.

21. The motor vehicle according to claim 20, wherein the intermediate member is made of a material including foam.

22. The motor vehicle according to claim 20, wherein the intermediate member is adhesively bonded to the bumper assembly.

23. The motor vehicle according to claim 20, wherein the intermediate member is adhesively bonded to the bumper assembly.

24. The motor vehicle according to claim 20, wherein the bumper assembly includes a bumper cover having a bumper mounting flange defining a portion of the light assembly hole; the light assembly having a light assembly flange; wherein the intermediate member is disposed between the bumper mounting flange and the light assembly flange.

25. The motor vehicle according to claim 24, wherein a mechanical fastener is used to attach the light assembly to the bumper cover and wherein the mechanical fastener extends through the intermediate member.

26. The motor vehicle according to claim 24, wherein the intermediate member is adhesively bonded to the bumper mounting flange.

* * * * *